United States Patent [19]
Sully

[11] Patent Number: 5,894,757
[45] Date of Patent: Apr. 20, 1999

[54] DEVICE FOR ENHANCING ROTATIONAL MOVEMENT

[76] Inventor: Paul Emile Sully, 2007-A Pennwood Dr., Melbourne, Fla. 32901

[21] Appl. No.: 08/900,316
[22] Filed: Jul. 25, 1997
[51] Int. Cl.⁶ .............................. F03G 3/08; F16H 21/40
[52] U.S. Cl. .................... 74/43; 74/572; 185/4; 185/29
[58] Field of Search .......................... 185/4, 29; 74/572, 74/43

[56] References Cited

U.S. PATENT DOCUMENTS

| | | | |
|---|---|---|---|
| 4,156,387 | 5/1979 | Portmann | 74/603 |
| 4,295,381 | 10/1981 | Hinds | 74/5 R |
| 5,335,532 | 8/1994 | Mueller et al. | 74/603 |

Primary Examiner—Charles A. Marmor
Assistant Examiner—William C. Joyce
Attorney, Agent, or Firm—McHale & Slavin, P.A.

[57] ABSTRACT

A device employing multiple counterweights for enhancing rotation movement. The device employs a horizontally disposed counterweight coupled to a vertically offset second counterweight by an adjacent sprocket. The sprocket times the counteracting weights to provide a single rotational direction whose inertia is maintained by a flywheel. The device has a 6:3:1 ratio resulting in a near continuous rotational movement upon the operational movement of the first and second counterweight. A generator may be coupled to the device providing a ancillary source of power.

14 Claims, 3 Drawing Sheets

DEVICE FOR ENHANCING ROTATIONAL MOVEMENT

FIELD OF THE INVENTION

This invention is directed to a device employing multiple counterweights for enhancing rotational movement.

BACKGROUND OF THE INVENTION

Counterweights are commonly used as counterbalances for rotating items. For instance, the drive shaft of an automobile employs counterweights for smooth rotational movement of the drive shaft at high revolutions. Similarly, the wheels of the automobile may employ counterweights to eliminate vibration during high speed revolution. Alternatively, a counterweight may be used to offset the weight of an item, such as a bridge. In these applications, the counterweights enhance control of the item by creating a fulcrum point across which the item is balanced.

Flywheels are a tool used with rotational items that assists in correcting system inefficiencies. A flywheel is typically formed from a massive amount of material that, once rotated, maintains a momentum of inertia. Automobile engines rely on flywheels to maintain momentum once the engine has started rotational movement. With the rotational movement enhanced by the flywheel, typically balanced by a counterweight, engine inefficiencies can be overcome thereby providing a steady engine torque. The mass of the flywheel provides rotational inertia which allows the flywheel to absorb and release energy with no noticeable variation in rotational speed.

Thus, counterweights and flywheels have typically been used in an effort to maintain the enhance the operation of a drive system in a manner so as to inhibit the inefficiencies thereof. However, what is lacking in the art is the teaching of a device using counterweights and flywheels to enhance rotational movement.

SUMMARY OF THE INVENTION

The instant invention employs two offsetting counterweights coupled together to provide complementary and counteracting balance between the weights. Each weight is of a different size having strategically positioned triangular cutouts allowing for a reciprocal over-center rotational movement.

A first counterweight is positioned and supported along a substantially horizontally disposed frictionless axis. Diametrically opposed connecting rods secured to each side of the counterweight are rotatably coupled to a linking sprocket. The rods move transversely in response to the rotation of the counterweight. The first counterweight rotates nearly 180 degrees and returns to a starting position in response to motion of a second counterweight also having connecting rods coupled to the linking sprocket. The second counterweight effectively counters the over-center rotation of the first counterweight.

The second counterweight has a mass of approximately one half the first counterweight and is oriented angular to the first counterweight. The shape of the second counterweight is similar to the first counterweight. Three strategically positioned triangular cutouts are formed in the weight with a portion of the weight circumference slightly enlarged so as to cause an off-center rotation. Counter-clockwise rotation of the second counterweight follows the clockwise rotation of the first counterweight. Similarly, clockwise rotation of the second counterweight operates to cause the counter-clockwise rotation of the first counterweight.

The counterweights are also coupled to a flywheel, through the linking sprocket. The flywheel has a mass of approximately one third the second counterweight providing the system with a 6:3:1 ratio. The flywheel provides an inertia and operates in a conventional manner providing rotational momentum to the first and second counterweights.

In operation, the movement of either counterweight will cause an over center rotation of the first counterweight in a clockwise or counter clockwise direction. This rotation will produce reciprocal rotation of the second counterweight. The first counterweight will then rotate through approximately 180 degrees, until the second counterweight provides a counter active force resulting in the return of the first counterweight to its original position. Upon the first counterweight's return to its original position, the first counterweight will over rotate to approximately 180 degrees in a counter-clockwise position. The second counterweight again rotates in opposition to the first counterweight causing the first counterweight to return to the original position. The sprocket that couples the two counterweights together is rotatably coupled to the flywheel, providing additional continuous rotational to each counterweight. The strategically placed cutouts provide a unique rotational movement that operates on the mass of weight, thus the position of the cutouts affecting the mass.

Thus an object of the instant invention is to teach a device that operates multiple counterweights so as to cause an efficient rotational, directional movement.

Still another object of the instant invention is to teach the use of offsetting counterweights to provide rotational movement for driving items such as generators.

Yet still another object of the instant invention is to teach a counterweight shape capable of rotating with a diminished expenditure of energy.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
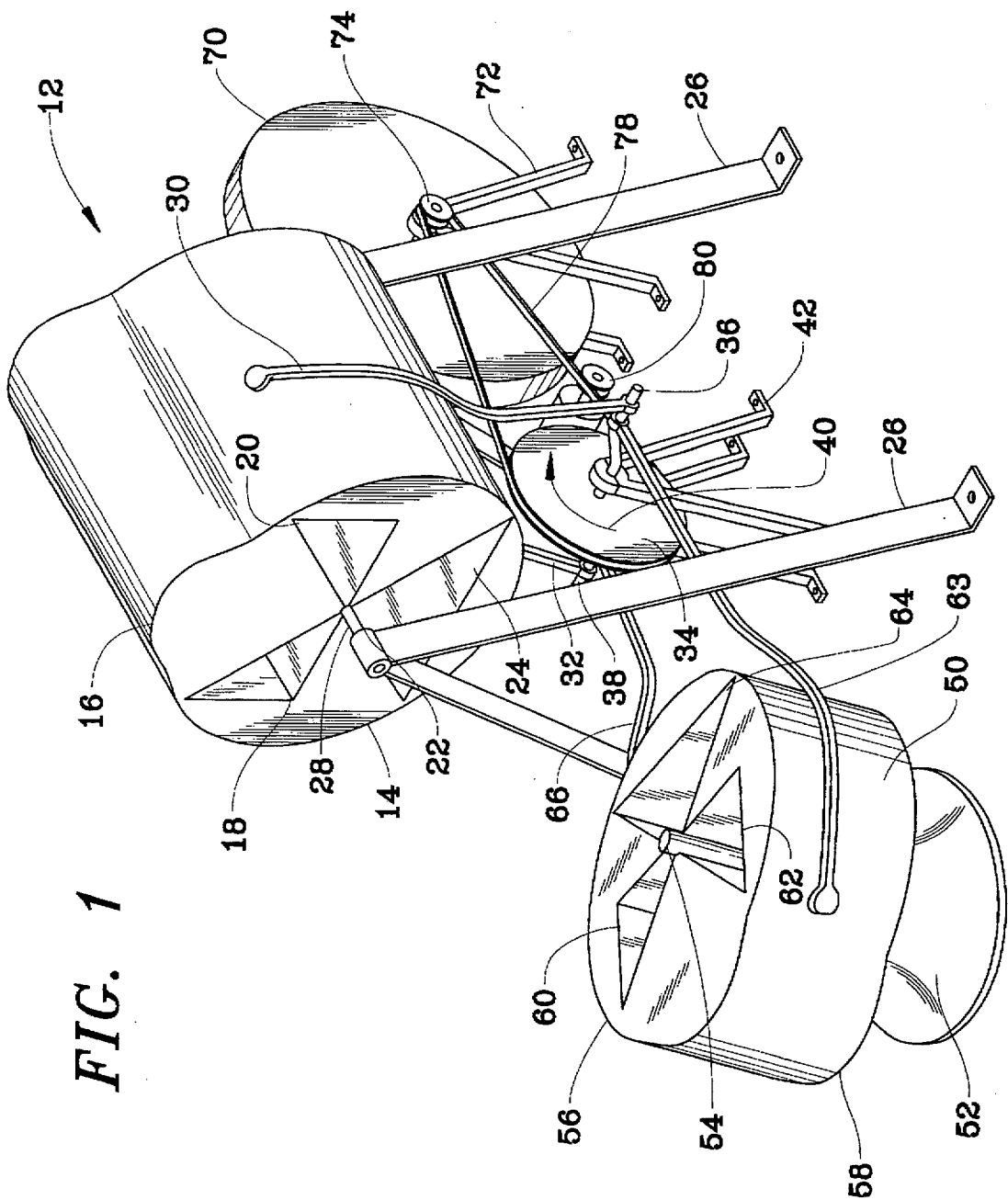
FIG. 1 is a pictorial perspective view of the system used in driving an electric generator.

Now referring to FIG. 1, set forth is a pictorial of the primary embodiment of the instant invention. A first counterweight 12 is shown having a substantially circular circumference 14 with an enlarged portion 16 strategically placed along an upper portion of the counterweight. The counterweight 12 is constructed of a dense material such as lead, steel, or concrete with triangular cut-outs 18, 20 placed along the longitudinal length of counterweight 12, adjacent to axis 22. A third triangular cut-out 24 has an edge along the axis 22. The size of cutout 24 approximates the total area removed by sections 18 and 20. However, the shape of the cut-out is reversed thereby affecting the gravitational pull during rotation.

The first counterweight 12 is supported by legs 26 which support shaft 28 to place the counterweight along a plane parallel to the ground. The counterweight 12 has a first connecting rod 30 and a second connecting rod 32. Each connecting rod 30, 32 is secured to the sprocket 34 causing rotational movement of the sprocket 34 when the counterweight rotates. The sprocket 34, has opposing drive-arms 36 and 38 which react to the counterweight rotation during movement of the counterweights. As a result, clockwise rotation of the first counterweight 12, causes the downward movement of connecting rod 30; sprocket 34 is moved in a clockwise direction 40 until connecting rod 30 forces arm 36 into its lower-most position. Similarity connecting rod 32 is rotated upward with arm 38 at its uppermost position, wherein the sprocket 34 continues its rotation in a clockwise direction. The sprocket 34 is supported from the ground by legs 42.

A second counterweight 50 is placed in an angular position between 15 and 40 degrees relative to the ground by use of support stand 52, having a shaft which extends through axis 54. The second counterweight includes a substantially circular circumference having a raised upper portion 58 and upper cut-outs 60 and 62, adjacent a lower cut-out 64. This arrangement provides a rotational counter-balance to the first counterweight. The second counterweight includes connecting rods 63 and 66 secured to the arms of the sprocket 34. As a result, the clockwise rotation of the first counterweight 12 causes downward movement of connecting rod 30, which results in the movement of the second counterweight 50 in a counter-clockwise position causing nearly a 180 degree rotation. The weighting of the second counterweight 50 counter balances the weighting of the first counterweight 12 allowing the reverse rotation wherein the second counterweight 50 rotates in a clockwise position and the first counterweight 12 rotates in a clockwise position. As this reciprocal rotation occurs, sprocket 34 continuously rotates in a clockwise direction 40. The second counterweight 50 is approximately one-half the mass of the first counterweight 12. The sprocket 34 is coupled to a flywheel 70 that is supported by flywheel support leg 72. The flywheel 70 has an axis 74 with a small sprocket coupled to a large sprocket 34, at a pre-determined ratio. Clockwise rotation 40 of the sprocket 34 causes the fly-wheel 70 to also rotate. The high-momentum helps maintains the first and second counterweight in their respective rotational movements. The flywheel 70 is coupled to the sprocket 34 by use of a flexible chain or drive-belt 78 capable of withstanding the torque transmitted and received by the flywheel.

Once the first and second counterweights have been placed in motion, the flywheel will continue the rotational motion, operating as a capacitor allowing the first and second counterweight to operate in a reciprocating fashion for an extremely long period of time. The rotational aspects of the sprocket allow for driving various power devices such as a generator 80 to convert rotational movement into power. The ratio of the first counterweight to the second counterweight to the flywheel is approximately 6:3:1.

Figure 2:
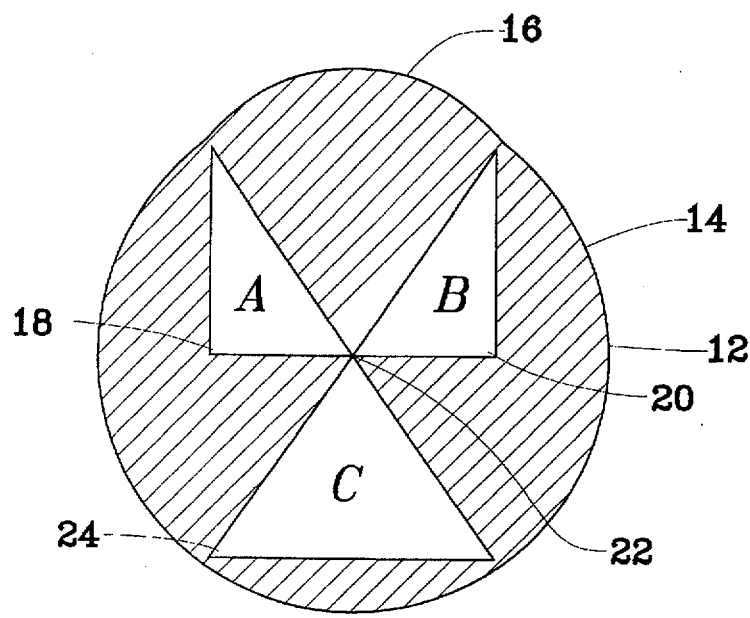
FIG. 2 is a cross sectional end view of a first counterweight.

Now referring to FIG. 2, set forth is a cross-sectional end view of the first counterweight 12 having a substantially circular outer circumference 14 with a raised portion 16 that resembles an enlarged hump along the upper portion of the counterweight. Cut-outs 18 and 20, depicted by letters A & B, extend along the longitudinal length of the counterweight 12 and approximate an equal amount of removed material. Section C, as depicted by numeral 24 opposes Section A & B, providing a substantially similar area of material removal however constitutes a single opening versus the bifurcated A & B openings. This design permits an over-center operation of the counterweight which has a rotational aspect affected by gravity to assimilate a weight shifting rotated about axis 22. Thus, a clockwise rotation of counterweight 12 causes the upper portion 16 to rotate until the removed material of section C causes a lessening of the rotation so as to prevent a complete rotation of the counterweight 12. This design also allows for the reverse of rotation with minimal energy exertion.

Figure 3:
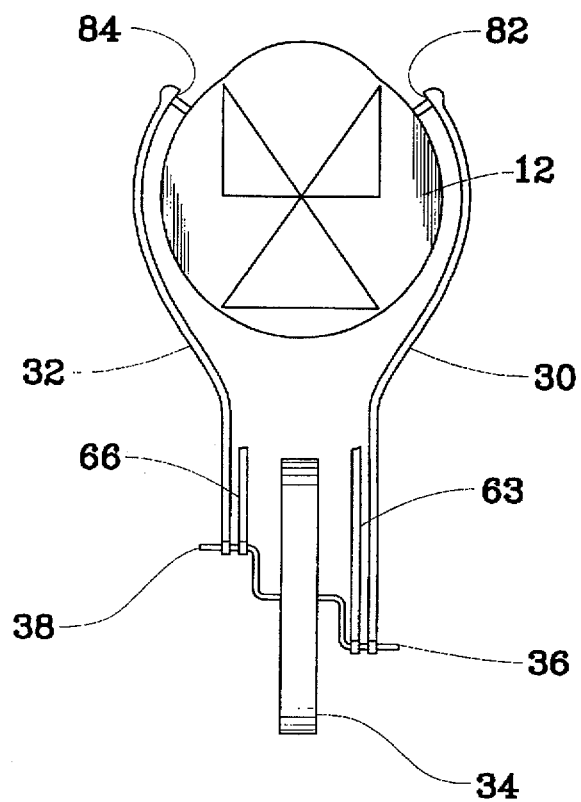
FIG. 3 is an end view of a first counterweight and attached linkage.

As shown in FIG. 3, counterweight 12 is coupled to sprocket 34 by connecting arms 30, 32 by use of a ball and joint type coupling 82 and 84. The ball and joint allows for both downward and circular motion. In this manner the sprocket 34 is free to rotate in a circular motion, moving the connection rods 30, 32 with minimal energy loss. This provides efficient load transfer. The sprocket 34 includes a directional shaft 36 extending out of one side. The shaft 36 is coupled to directional shaft 38 extending out of the second side. The shafts 36 and 38 may be defined as a crank handle having opposing arms so as to allow rotation of connecting rod 30 in one direction while directing rod 32 is moved in an opposite direction. Connecting rods 63 and 66 are depicted in a partial format as they are coupled to the second counterweight, not shown.

Figure 4:
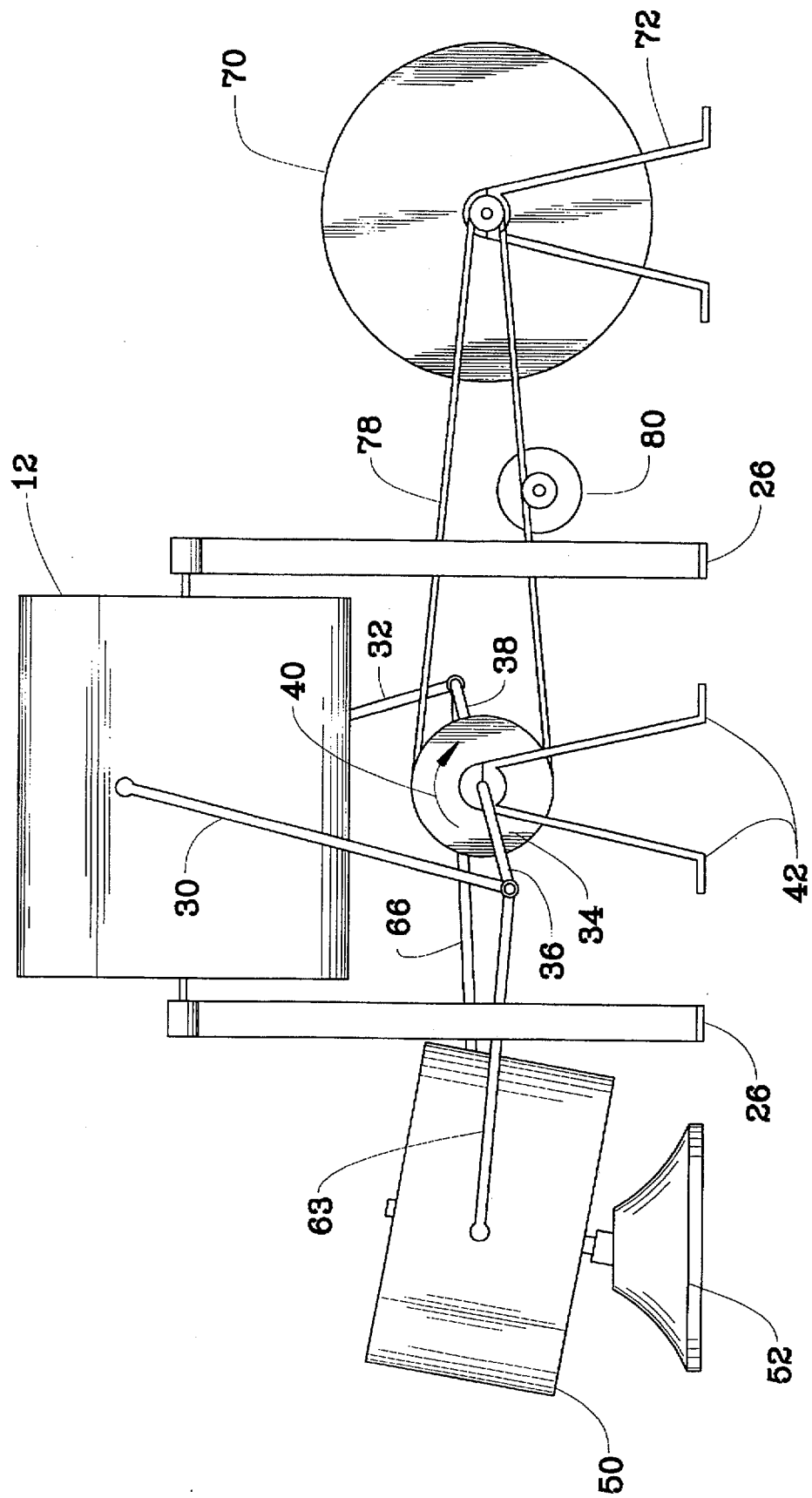
FIG. 4 is a side pictorial view of FIG. 1.

Now referring to FIG. 4, a side view of the invention is disclosed with the first counterweight 12 placed in a horizontal orientation above the ground and supported by legs 26. The sprocket 34 is positioned beneath the first counterweight 12 in a raised position, by stand 42. The second counterweight 50 is placed in an angular orientation relative to the floor and the first counterweight by support stand 52. The crank 36 and 38 of the sprocket 34 is rotated in a clockwise direction by movement of the counterweight, causing connecting rod 30 to move in an upward position. In response, connecting rod 63 operates in a downward position. Similarly, connecting rod 32 is moved in a downward position while connecting arm 66 is placed in a upward position. The rotational movement of the sprocket 34 causes the clockwise rotation 40 which is translated by a chain or belt to flywheel 70. As previously mentioned the 6:3:1 ratio allows for a continuous rotation of sprocket 34 with minimal energy expenditure and flywheel 70 provides needed momentum at the inefficient portions of counterweight cycles. The generator 80, as depicted, receives the rotational movement of the coupling band 78 for use in generating of electricity.

It is to be understood that while a certain form of my invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A rotational movement enhancing device comprising:
   a first counterweight formed from a substantially-cylindrical shaped mass of material, said first counterweight rotatable about a horizontally-disposed axis; a second counterweight formed from a substantially cylindrical shaped mass of material, said second counterweight rotatable about a vertically-offset axis; a sprocket formed from a circular disk having a crank arm placed along a first side surface and an opposing positioned crank arm placed along an opposite second side surface, said sprocket positioned a predetermined distance between said first and second counterweight; connecting rod means for coupling said first and second counterweights to said sprocket; a flywheel; and a means for coupling said flywheel to said sprocket;

wherein movement of said first counterweight in a clockwise rotation will cause an enlarged portion of said first counterweight to travel along an arc bisected by a vertical plane, said vertical plane containing said horizontally-disposed axis a reciprocal rotation of said second counterweight through directional rotation of said sprocket, with said flywheel providing momentum whereby said device may be used to enhance rotational movement of a rotatable object.

2. The rotational movement enhancing device according to claim 1 wherein said first counterweight is approximately twice the mass of said second counterweight.

3. The rotational movement enhancing device according to claim 1 wherein said second counterweight is approximately three times the mass of said flywheel.

4. The rotational movement enhancing device according to claim 1 wherein said first counterweight has a first and second triangular cut-out disposed along a longitudinal length of a first portion of said first counterweight and a third triangular cut-out placed along a longitudinal length of a second portion of said first counterweight, said first portion being diametrically opposed from said second portion.

5. The rotational movement enhancing device according to claim 4 wherein a portion of an outer circumference of said first counterweight is enlarged providing an off-set mass to said first portion of said first counterweight.

6. The rotational movement enhancing device according to claim 1 wherein said second counterweight has a first and second triangular cut-out placed along a longitudinal length of a first portion of said second counterweight and a third triangular cut-out placed along a longitudinal length of a second portion of said second counterweight, said first portion being diametrically opposed from said second portion.

7. The rotational movement enhancing device according to claim 6 wherein a portion of an outer circumference of said second counterweight is enlarged providing an off-set mass to said first portion of said second counterweight.

8. The rotational movement enhancing device according to claim 1 wherein said vertically off-set axis is oriented between 15 and 40 degrees from vertical.

9. The rotational movement enhancing device according to claim 1 wherein said first counterweight is positioned above said sprocket and said second counterweight and said flywheel are positioned adjacent to said sprocket.

10. A rotational movement enhancing device comprising:

a first counterweight formed from a substantially-cylindrical shaped mass of material, said first counterweight rotatable about a horizontally disposed axis, said first counterweight having a first and second triangular cut-out placed along a longitudinal length of a first portion of said first counterweight and a third triangular cut-out placed along a longitudinal length of a second portion of said first counterweight, said first portion being diametrically opposed from said second portion;

a second counterweight formed from a substantially cylindrical shaped mass of material, said counterweight rotatable about a vertically-offset axis, said second counterweight having a first and second triangular cut-out placed along a longitudinal length of a first portion of said second counterweight and a third triangular cut-out placed along a longitudinal length of a second portion of said second counterweight, said first portion being diametrically opposed from said second portion;

a sprocket formed from a circular disk having a crank arm placed along one side surface and an diametrically opposed crank arm placed along an opposite side surface, said sprocket positioned a predetermined distance between said first and second counterweights;

connecting rod means for coupling said first and second counterweights to said sprocket;

a flywheel; and means for coupling said flywheel to said sprocket;

wherein rotation of said first counterweight will cause an reciprocal rotation of said second counterweight and rotation of said sprocket with said flywheel providing a continuous momentum of inertia whereby said device may be used to enhance rotational movement of a rotatable object.

11. The rotational movement enhancing device according to claim 10 wherein said first counterweight and said second counterweight and said flywheel have a 6:3:1 mass ratio.

12. The rotational movement enhancing device according to claim 10 wherein a portion of an outer diameter of said first counterweight is enlarged providing an off-set mass to said first portion of said first counterweight.

13. The rotational movement enhancing device according to claim 10 wherein a portion of an outer diameter of said second counterweight is enlarged providing an off-set mass to said first portion of said second counterweight.

14. The rotational movement enhancing device according to claim 10 wherein said means for coupling said flywheel to said sprocket is a flexible chain.

* * * * *